United States Patent [19]
Koljonen et al.

[11] Patent Number: 5,754,679
[45] Date of Patent: *May 19, 1998

[54] IMAGE ROTATING METHOD FOR LOCATING BOND PADS IN AN IMAGE

[75] Inventors: Juha Koljonen, Needham; David Michael, Newton; Yasunari Tosa, Arlington, all of Mass.

[73] Assignee: Cognex Corp., Natick, Mass.

[*] Notice: The term of this patent shall not extend beyond the expiration date of Pat. No. 5,757,956.

[21] Appl. No.: 551,120

[22] Filed: Oct. 31, 1995

[51] Int. Cl.⁶ ........................................... G06K 9/00
[52] U.S. Cl. ................ 382/151; 382/216; 382/146; 348/95
[58] Field of Search ..................... 382/145–147, 382/150–151, 209, 216–218, 291, 199; 348/87, 94–95, 125–126; 364/559, 551.02

[56] References Cited

U.S. PATENT DOCUMENTS

| | | | |
|---|---|---|---|
| 3,936,800 | 2/1976 | Ejiri et al. | 382/205 |
| 4,115,702 | 9/1978 | Nopper | 356/384 |
| 4,115,762 | 9/1978 | Akiyama et al. | 382/151 |
| 4,200,861 | 4/1980 | Hubach et al. | 382/216 |
| 4,441,206 | 4/1984 | Kuniyoshi et al. | 382/287 |
| 4,688,088 | 8/1987 | Hamazaki et al. | 382/151 |
| 4,736,437 | 4/1988 | Sacks et al. | 382/216 |
| 4,783,826 | 11/1988 | Koso | 382/147 |
| 4,860,374 | 8/1989 | Murakami et al. | 382/151 |
| 4,876,728 | 10/1989 | Roth | 382/153 |
| 4,922,543 | 5/1990 | Ahlbom et al. | 382/291 |
| 4,955,062 | 9/1990 | Terui | 382/287 |
| 4,959,898 | 10/1990 | Landman et al. | 29/705 |
| 4,962,423 | 10/1990 | Yamada et al. | 382/144 |
| 5,073,958 | 12/1991 | Imme | 382/267 |
| 5,081,656 | 1/1992 | Baker et al. | 348/87 |
| 5,086,478 | 2/1992 | Kelly-Mahaffey et al. | 382/151 |
| 5,113,565 | 5/1992 | Cipolla et al. | 382/151 |
| 5,133,022 | 7/1992 | Weideman | 382/172 |
| 5,134,575 | 7/1992 | Takagi | 382/147 |
| 5,206,820 | 4/1993 | Ammann et al. | 382/151 |
| 5,265,173 | 11/1993 | Griffin et al. | 382/103 |
| 5,371,690 | 12/1994 | Engel et al. | 382/141 |
| 5,475,766 | 12/1995 | Tsuchiya et al. | 382/144 |
| 5,495,537 | 2/1996 | Bedrosian et al. | 382/209 |
| 5,532,739 | 7/1996 | Garakani et al. | 382/150 |
| 5,566,877 | 10/1996 | McCormack | 348/126 |
| 5,602,937 | 2/1997 | Bedrosian et al. | 382/151 |

*Primary Examiner*—Leo Boudreau
*Assistant Examiner*—Bhavesh Mehta
*Attorney, Agent, or Firm*—David J. Powsner

[57] ABSTRACT

A machine vision system for identifying the locations of bonding pads on an integrated circuit mounted in a lead frame. The system involves rotating the image of the die to produce an image of the die unrotated with respect to the lead frame (the "counter-rotated image"). The counter-rotated image is searched with corner templates of the bonding pad. A set of possible candidate bonding pads is created from the location of corner templates found during the search. The set is then scored utilizing matching criteria. The best candidate is selected from the set based upon the candidates' scores. The location of the bonding pad is then generated from the best candidate's corner template locations. The invention can be beneficially applied to locate bonding pads during wire bonding, as well as other machine vision applications.

13 Claims, 10 Drawing Sheets

IMAGE ROTATING METHOD FOR LOCATING BOND PADS IN AN IMAGE

BACKGROUND OF THE INVENTION

The invention pertains to machine vision and, more particularly, to methods and articles of manufacture for locating bonding pads of a die mounted in a lead frame.

In automated assembly processes, such as those for bonding wires from an integrated circuit die to a lead frame, it is important to determine the exact location of the bonding pads on the die. Without that information, a wire bonding machine may "miss" the pads and bond wires to the wrong part the die, thereby, rendering it nonoperational.

As integrated circuits continue to grow in density, additional logical functions are being placed onto a single integrated circuit die. For instance, where in the past the central processing unit, the memory management unit and the math coprocessor unit would each occupy a separate integrated circuit, modern microprocessor now combine all of these functions on a single chip. In addition, where past microprocessor utilized 8, 16 or 32 bit address and data busses, modern processors now utilize 32 and 64 bit address and data busses. Thus a single integrated circuit may require hundreds of electrical connections in order to control and communicate with the off-chip world.

Space is a valuable resource on an integrated circuit die. The increase in circuit density on an integrated circuit corresponds to an increase in area of the die. While the size of integrated circuit dies can increase, each increase in size lowers the yield and raises the production cost. Thus, there is a need to conserve die area on the integrated circuit. One method of conserving die area is to decrease the size of the circuits present on the integrated circuit. This includes the bonding pads, the contact areas utilized to make connections with the outside world.

The increase in off-chip electrical connections and the pressure to conserve die area has forced the bonding pads to occupy a smaller area of decreasing in size making the accuracy of wire bonding process crucial. The decreases in bonding pad area increases the need for accuracy in wire bonding process, as the smaller bonding pad area provides a smaller target for the wire bonder. In addition, increases in the number of bonding pads also increase the need for accuracy during the wire bonding process, as the increased number of bonding pads increases the probability of cumulative errors. Thus, due to the increased number of bonding pads, and due to those pads occupying a smaller area, small errors in the locating of pads during the wire bonding process may precipitate wiring errors.

One possible source for pad location errors is introduced during the die mounting process. Integrated circuit dies are mounted and affixed to a carrier containing a lead frame. The die is located such that wires may be connected between the lead frame and the die. It is the lead frame that conveys the electrical signals to the off-chip world, and typically is utilized as the frame of reference for the wire bonder. When the integrated circuit die is mounted into a carrier, the die may be affixed at a small angle relative to the lead frame. This angle causes the wire bonder to misalign, as the wire bonder assumes the lead frame is the proper axis for locating the bonding pads. Because the wire bonder incorrectly assumes that the die is mounted on the same axis as the lead frame, the wire bonding process may fail for a rotated die.

Past methods of correcting for such errors have relied upon operator intervention. The operator can correct for rotational errors by manually aligning the bonder relative to the die during the die process. But operator intervention may itself introduce errors in the wire bonding process, while at the same time slowing the bonding process and increasing its cost. Ideally, the wire bonding process should be able to correct for small rotations of the die and reduce the need for operator intervention.

Therefore, it is an object of this invention is to provide improved methods for machine vision analysis.

A more particular object of this invention is to provide improved methods for finding the location of a bonding pad rotated relative to a lead frame.

Still another object is to provide such methods that can be readily adapted for use in wire bonding, as well as in other machine vision applications.

Still yet another object of the invention is to provide articles of manufacture comprising a computer usable medium embodying program code for carrying out improved such methods.

SUMMARY OF THE INVENTION

The foregoing objects are attained by the invention which provides a method for operating a digital data processor to locate bond pads in an image of a die mounted in a lead frame. The digital data processor is of the type including machine vision tools (e.g., a machine vision processor) such as a corner template-generating element that generates templates of corners of bonding pads; an image-rotating element that rotates an applied image; a search element that determines the location (and correlation) of an applied template in an image; and a pad locating element that determines the location of a bonding pad given locations of two or more of its corners.

In one aspect, the method comprises applying the image to the image rotating element to generate an image depicting the unrotated relative to the lead frame, to wit a counter-rotated image. The method further comprises invoking the corner template generator to generate templates of two or more corners of an unrotated bonding pad. For at least one bonding pad in the image, those templates and the counter-rotated image are applied to the search element to determine locations of apparent corners of that bonding pad. Those locations are then applied, along with the angle of the die relative to the lead frame, to the pad locating element to determine a location of the bonding pad, e.g. for use by wire-bonding equipment.

In another aspect, the invention provides a method as described above further including a training step in which the locations of plural bond pads are found in an image of a model die mounted in a lead frame. Those locations, or relative locations based thereon, are stored for use in a run-time step. That step contemplates determining the location of a first bond pad or other reference feature in an image of an actual die mounted in a lead frame and, then, determining locations of other bond pads in that image based on the location of the first bond pad and on the locations stored in the training step.

In still another aspect, the invention provides a method as described above in which a set of candidate bond pads is created from locations of at least pairs of the apparent corners found in the image. Each of those candidate pads is scored based on one or more of the following criteria: a number of apparent corners present in a candidate bonding pad, a shape of a candidate bonding pad; a size of a candidate bonding pad, a brightness of the input image at the location of an apparent corner of a candidate bonding pad, a rectilinearity of a candidate bonding pad, an aspect ratio of that candidate bonding pad. The candidate with the highest score is then selected as the actual bond pad. The location of that pad is generated for use, e.g., by wire-bonding equipment.

In yet another aspect, the invention contemplates determining an angle of rotation of the die to the lead frame, e.g., by querying the operator, by finding an angle of a contour of the die in the image, or by searching the image with a set of pre-rotated die templates to see which best matches.

These and other aspects of the invention are evident in the drawings and in the detailed description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
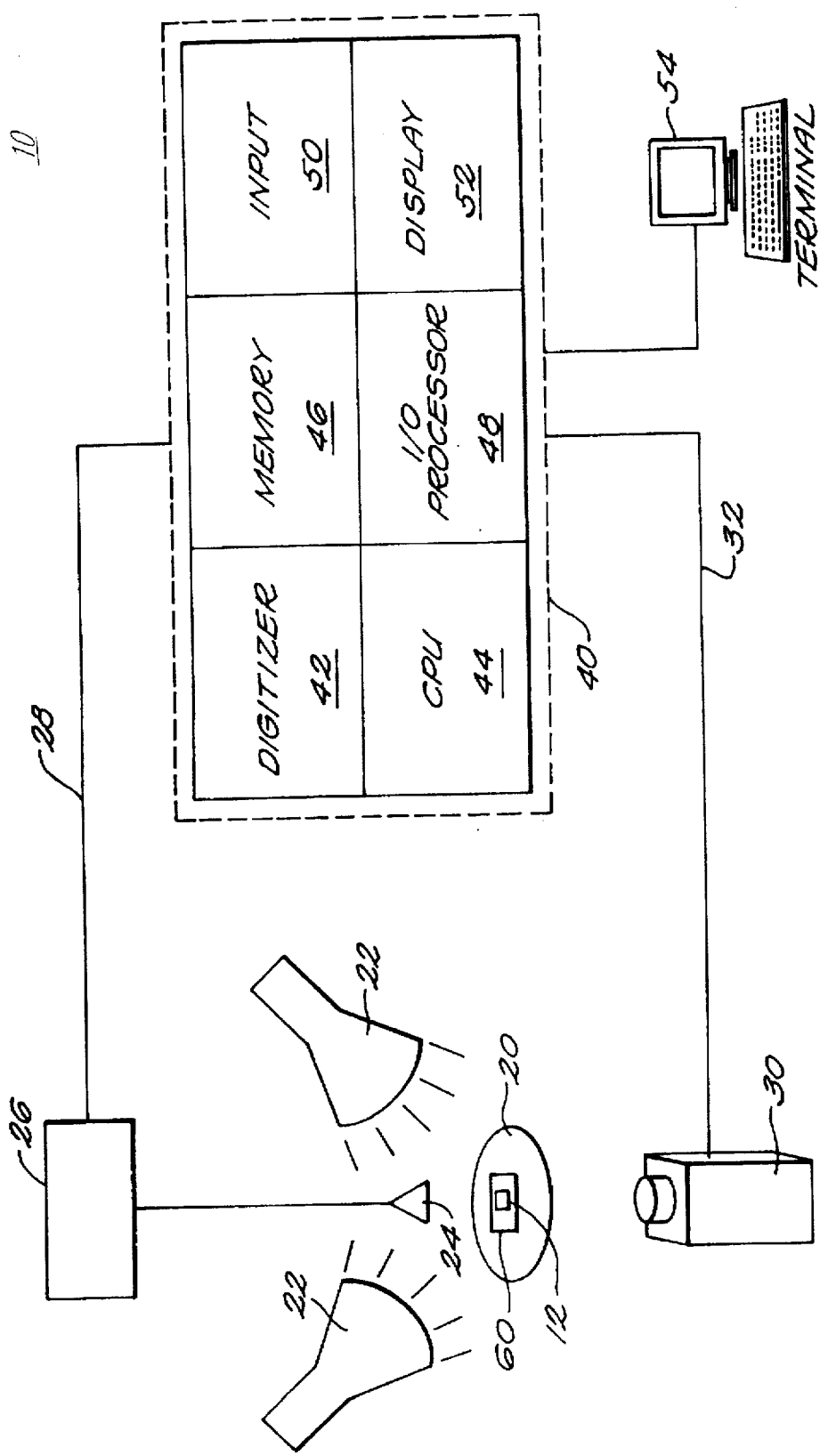
FIG. 1 is a diagrammatic representation of a machine vision system of the type used to practice the invention.

FIG. 1 is a diagrammatic representation of a wire bonding system utilizing the present invention. The system 10 includes a video camera 30 for generating a video signal 32 depicting the integrated circuit die 12 in a lead frame 60. A mount 24 holds the lead frame during wire bonding. Actuator 26, such as a servo or robotic actuator, moves the mount 24, and thus the lead frame 20.

The wire bonding system 10 further includes an image analyzing system 40 for performing an automatic vision analysis of the object 60. The image analyzing system 40 determines characteristics of the object 60, such as position, boundary and orientation, based on processing and analyzing the video image signal 32 from the video camera 30.

In a preferred embodiment of the invention, image analyzer 40 represents a conventional digital data processing system having an image digitizer 42, memory 46, at least one CPU 44, and input/output processing elements 48 for interfacing the system 40 to peripheral input and output devices. The image analyzer may also include input devices 50, such as a keyboard or mouse, and output devices 52, such as a display monitor and printer as well as interface with one or more terminals 54.

Image analyzer 40 and its components 42–54 comprise any commercially available digital data processor, e.g., a personal computer or workstation, programmed for operation in accord with the teachings of this application. Preferred image analyzers 40 suitable for such programming are sold by the assignee hereof, Cognex Corporation. Those skilled in the art will appreciate that programming the analyzer 40 for operation in accord with the teachings of the invention includes storing in memory 46 (and, optionally, other computer readable storage media, such as magnetic diskettes or hard disks) a computer program that enables CPU 44 to carry out the methodology of FIG. 7.

Figure 2:
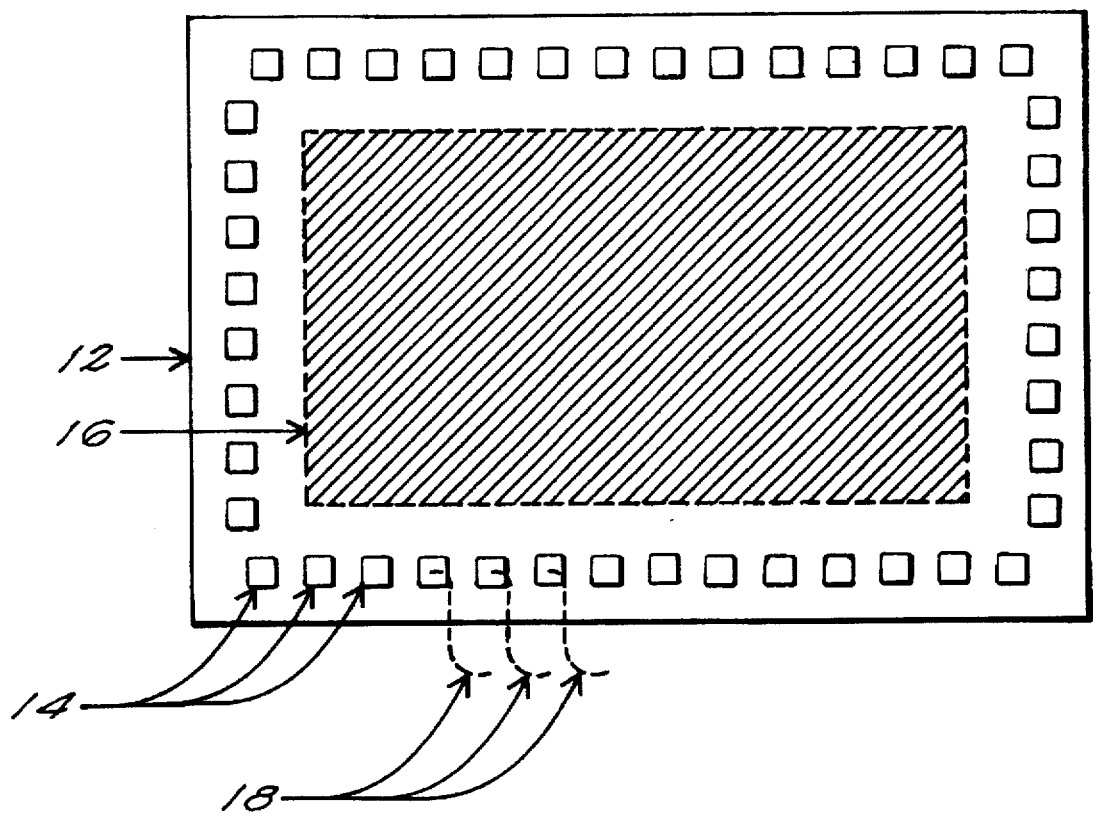
FIG. 2 illustrates an integrated circuit die with bonding pads and bonding wires.

FIG. 2 is a diagrammatic representation of an integrated circuit die 12 containing electronic circuitry 16 and bonding pads 14. Electronic circuitry 16 etched into the die connects to off-die components through bond pads 14, via bonding wires 18 and lead frame connections, as shown in FIG. 3 and discussed below.

Figure 3:
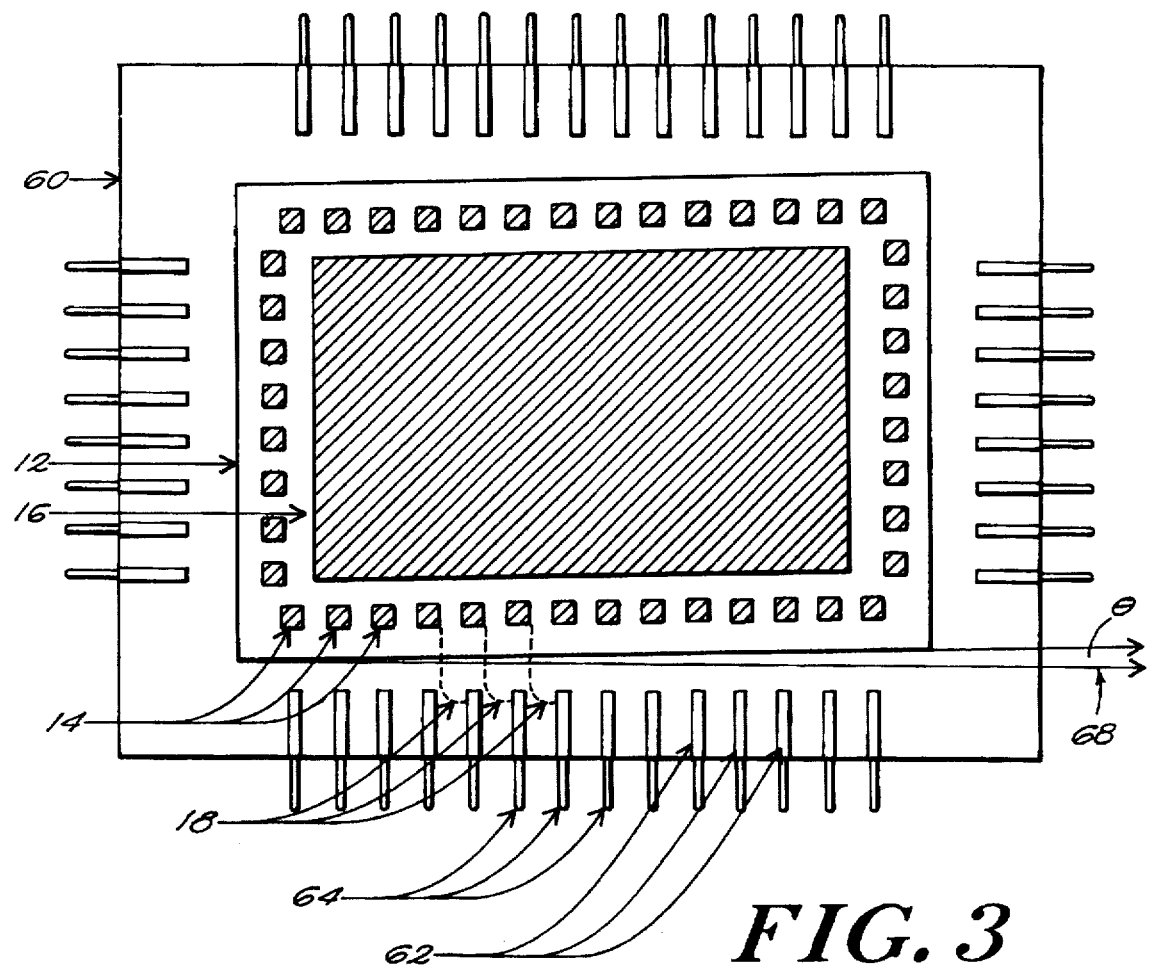
FIG. 3 illustrates an integrated circuit die with bonding pads mounted at a rotation within a lead frame with the bonding pads connected to the lead frame contacts via bonding wires.

FIG. 3 illustrates an integrated circuit die 12 mounted in a lead frame 60. Lead frame 60 provides electrical connections or contacts 62, which further communicate with the off-die environment. In the wire bonding process, very fine bonding wires are bonded between bond pads 14 and the electrical connections 62 on lead frame 60. Electrical connections 62 are connected to contacts 64, which are utilized to communicate off-die. Thus, when the wire bonding process is complete, the integrated circuit assembly may be utilized via the contacts 64 which are in turn connected in turn to electrical connections 62, bonding wires 18, bonding pads 14 and thus electronic circuitry 16.

The wire bonding process is critical for operation of electronic circuitry 16. Bond pads 14 must be accurately located relative to the lead frame 60 in order to connect bonding wires 18 between bond pads 14 and electrical connections 62. Typically, a die 12 is carefully mounted in lead frame 60 during fabrication.

Figure 4:
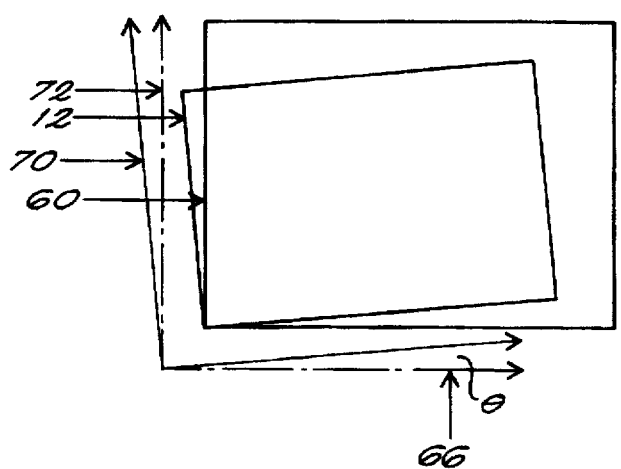
FIG. 4 illustrates the angle of rotation between an integrated circuit die and a lead frame in which the integrated circuit die is mounted.

With reference to FIG. 4, during the placement process of die 12 in lead frame 60 small rotation errors 66 are introduced. Rotational error 66, shown here as the angle $\Theta$, represents the angle of deviation between die axis 70 and the lead frame axis 72. In other words, rotational error 66 is the angle between the frame of reference 72 for the lead frame 60 and the frame of reference 70 for the integrated circuit die 12. Because the wire bonder uses the frame of reference 72 for the lead frame 60, the calculated positions for the bonding pads 14 have an offset or displacement with respect to the electrical connections 62.

Figure 5:
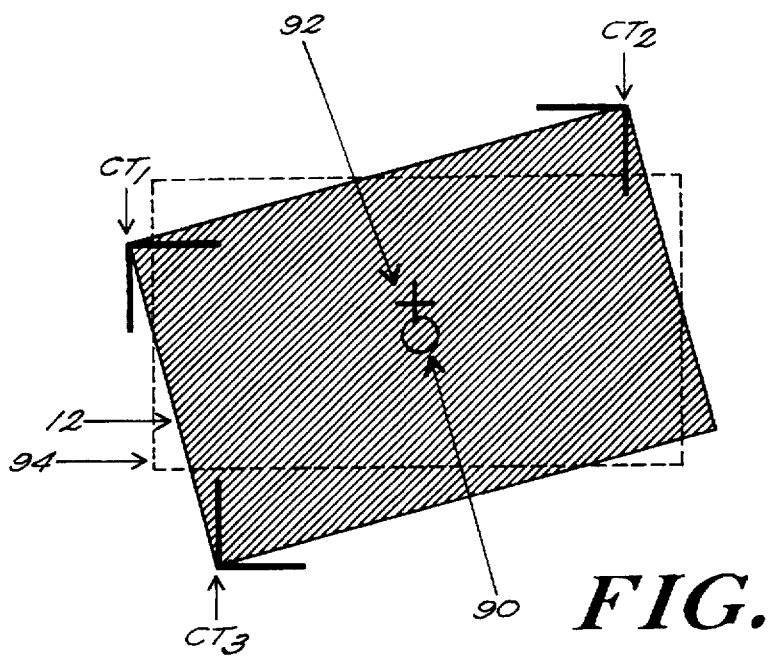
FIG. 5 illustrates the actual location and the calculated location for a rotated bonding pad where the location is calculated without accounting for rotational errors.

FIG. 5 illustrates a potential location error when rotational errors are not accounted for when locating bond pads. Because the illustrated example assumes zero rotational angle $\Theta$, the candidate location 92 is not the actual location 90.

In order to automate the bonding process, the angle $\Theta$ must be accounted for in order to calculate and correct for the bonding pad displacement. If the angle is not accounted for, the wire bonder will assume that the die axis 70 and lead frame axis 72 of FIG. 4 are the same, leading to errors in the wire bonding process. The present invention takes into account the rotational angle $\Theta$ in the bonding pad location process.

Figure 6:
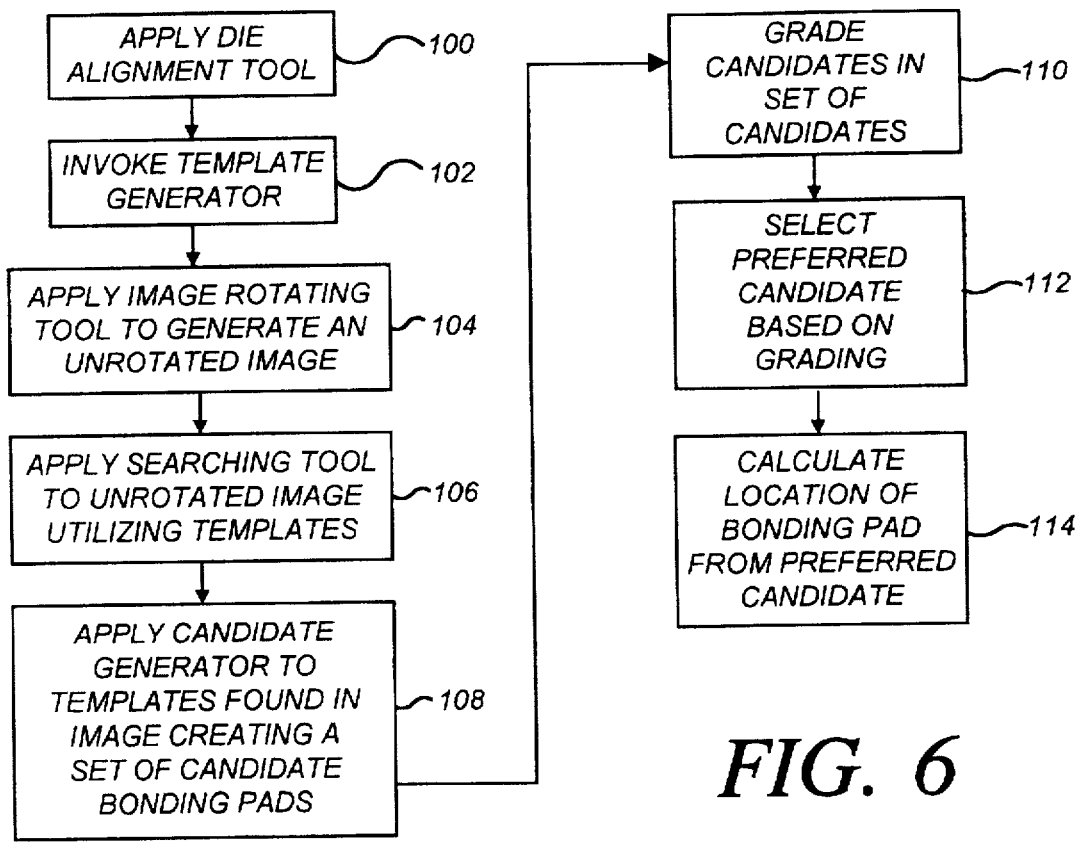
FIG. 6 depicts the method of the present invention for locating a bonding pad on an integrated circuit die mounted at a rotation in a lead frame.

FIG. 6 is a flow chart illustrating the method according to the present invention. In step 100, the angle of rotation $\Theta$ of the die relative to the lead frame is ascertained.

Figure 7A:
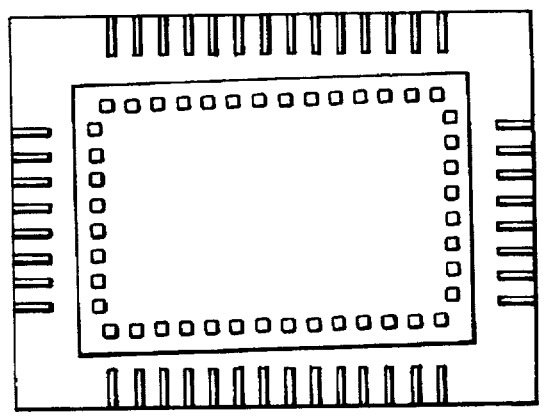
FIG. 7 illustrates methods of present invention for determining the angle of an integrated circuit die mounted in a lead frame.

For example, as shown in FIG. 7A, the operator of the wire bonding system may directly measure the angle of rotation $\Theta$ of the die relative to the lead frame. The operator can view the die directly, or through the vision system, and measure the angle of rotation of the die relative to the lead frame. Once the angle is determined, it may be manually inputted into the system for use in further processing according to the illustrated embodiment.

Figure 7B:
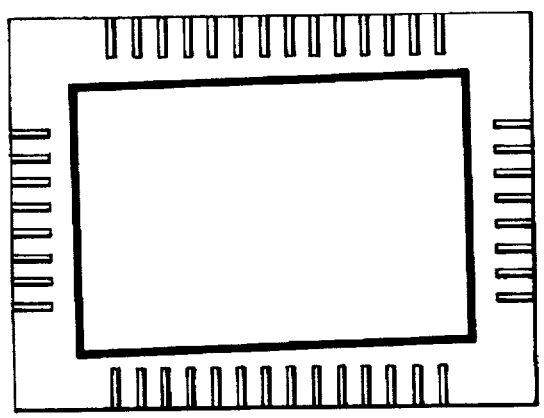

In an alternative embodiment, the system searches the image for an object and calculates the angle of rotation directly. With reference to FIG. 7B, the system searches for the die utilizing a contour angle finder tool, such as the one described in U.S. patent Ser. No. 07/979,848 filed on Nov. 11, 1992, the teachings of which are incorporated herein by reference. The contour tool follows the contour of the object, creating an "outline" of the object from which the angle of rotation may be measured.

Figure 7C:
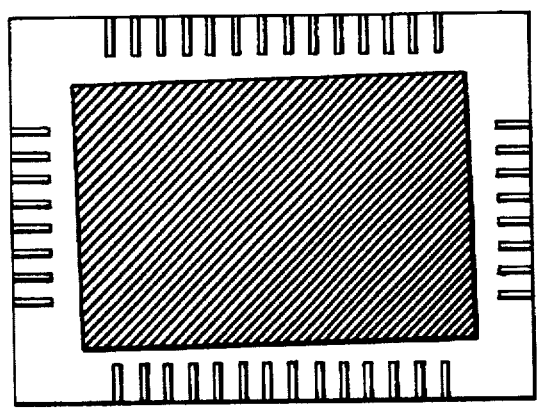
Figure 7C:
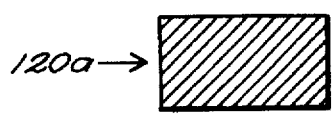
Figure 7C:
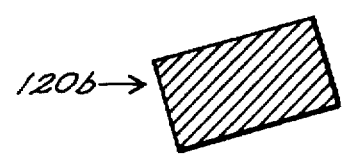
Figure 7C:
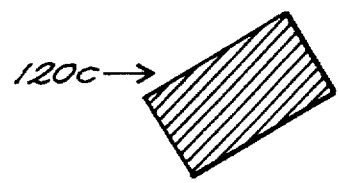

In another embodiment, shown in FIG. 7C, the vision system utilizes templates of the die rotated known amounts, such as templates 120a, 120b and 120c. These templates are then utilized in conjunction with the searching tool to find a corresponding match. The angle of rotation of the die can be interpolated from the angles of the closest fitting templates. Machine vision search tools are well known in the art. A preferred such tool is available from the assignee hereof.

Figure 8:
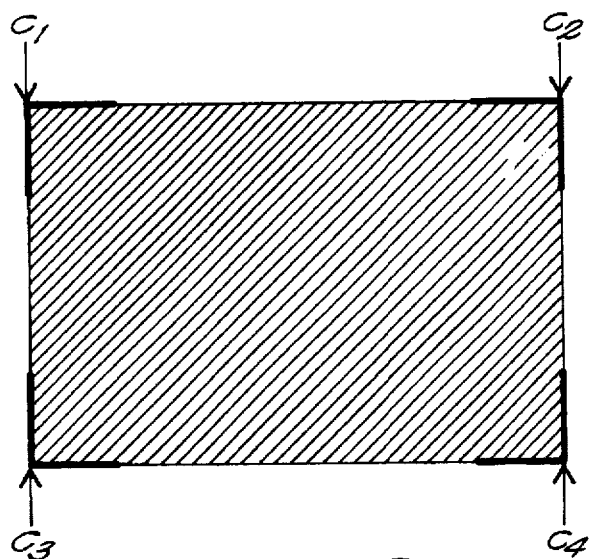
FIG. 8 illustrates a candidate bonding pad with corner templates.

Referring back to FIG. 6, in step 102, the method invokes a template generator for creation of corner templates which are utilized to search the image. FIG. 8 illustrates the four corners $C_1$, $C_2$, $C_3$ and $C_4$ of bonding pad 12 for which templates are generated. The templates are generated in a conventional manner known in the art. While the bonding pad corners illustrated in FIG. 8 contain 90 degree angles, this is not a requirement. Templates for other corner shapes can be utilized.

A template is a digital representation for a feature which may represent an object or only a portion of an object. The representation contains a grey scale image of the feature's image, including details which are utilized for identification of the feature in an image. Thus, a template provides a representation which may be utilized in scanning an image in order to locate a feature within the grey scale image. The bonding pad corner templates are utilized to scan an image in order to locate bonding pads within the image.

Figure 9:
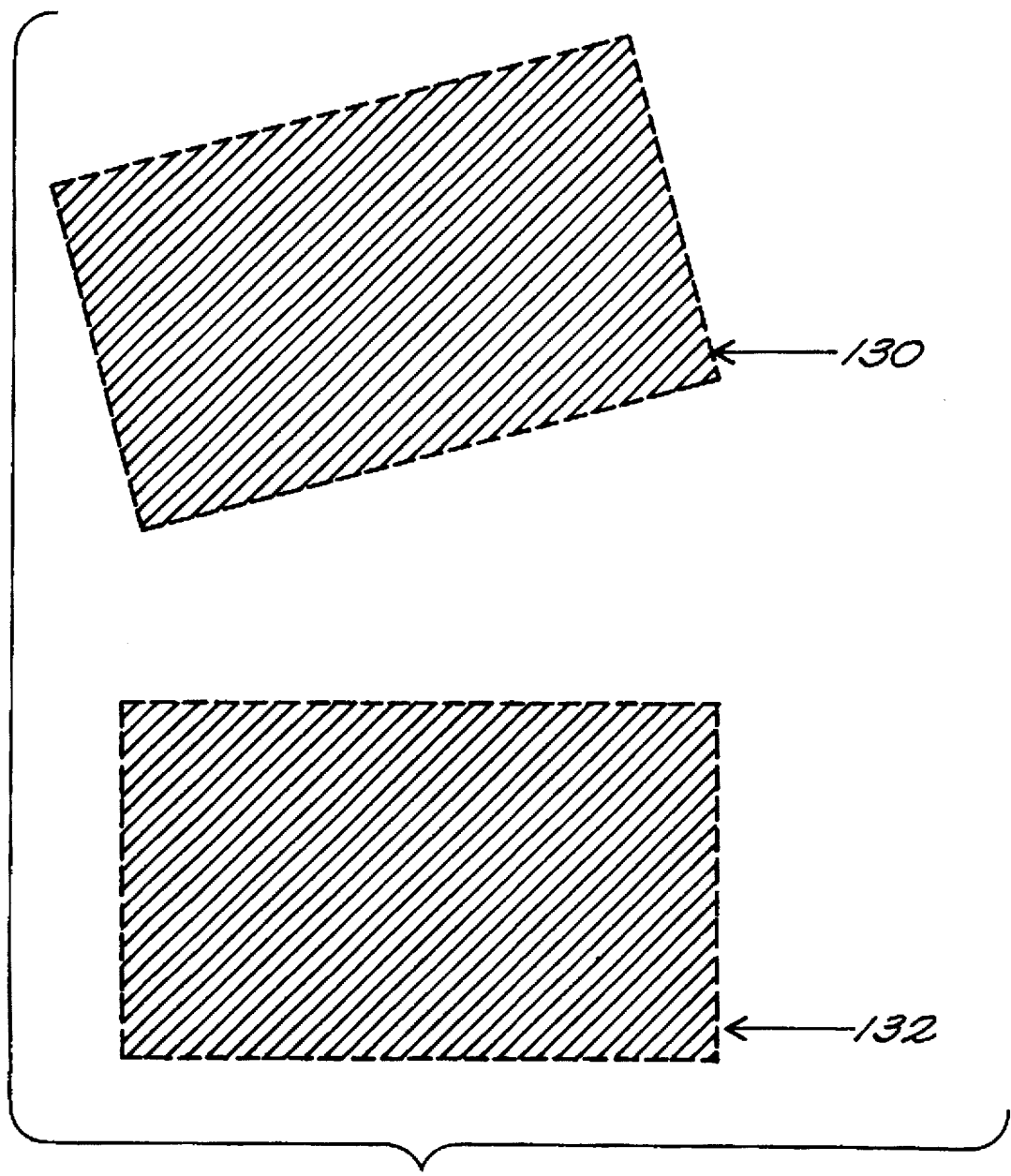
FIG. 9 illustrates an image and an unrotated image.

In step 104, of FIG. 6, the image rotating tool is applied to the image to be searched with an angle for the image to be rotated. The image can be rotated in a conventional manner known in the art or, preferably, by using the cip__nn__rotate machine vision tool available from the assignee hereof. The angle of rotation is proportional to the angle measured in step 100. An example of an image and a rotated image is illustrated in FIG. 9. The original image 130 represents the die as mounted within the lead frame with the rotated image 132, shown rotated counter clockwise, representing the die in the rotated frame of reference.

In step 106 of FIG. 6, the searching tool is applied utilizing the templates to search the rotated image for matches corresponding to the corner templates. The tool may be applied to an image representing the complete integrated circuit die with all of the bonding pads, or, preferably, applied to only a portion of the image containing a single bonding pad or a portion of bonding pad.

The rotated corner templates found within the rotated image are formed into groups, or candidates, in step 108. Each group represents a possible bonding pad found within the rotated image. In order to distinguish the complete pad from any partial pads that may be in the rotated image, as well as any other pattern in the rotated image that may correlate with the corner templates, the illustrated embodiment groups corners identified by the search into candidates, each candidate containing at least two opposing corners and, therefore, potentially representing corners of an actual bonding pad.

Figure 10:
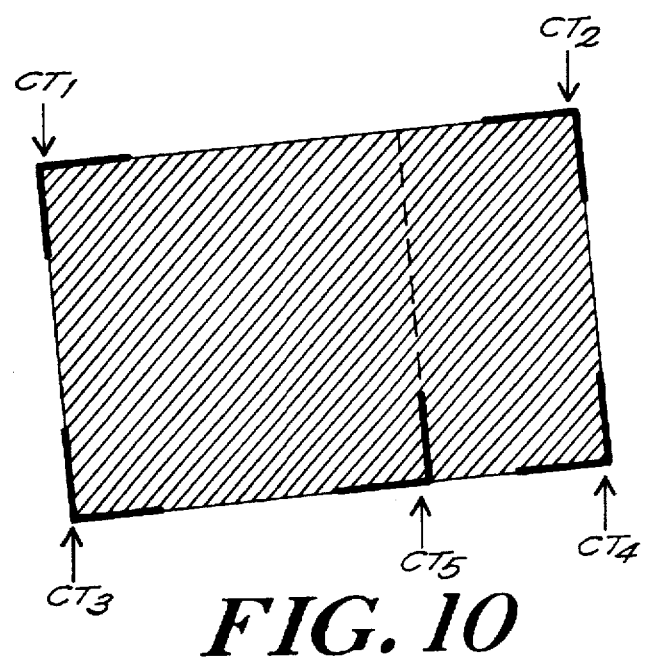
FIG. 10 illustrates candidate templates found in practicing the invention in an image containing a bonding pad for an integrated circuit.

FIG. 10 illustrates an example of corners located within the image. Here corners $CT_1$, $CT_2$, $CT_3$, $CT_4$ and $CT_5$ have been found. For the example illustrated, eleven candidates are possible: $(CT_1, CT_2, CT_3)$ $(CT_1, CT_2, CT_5)$ $(CT_1, CT_3, CT_4)$ $(CT_1, CT_3, CT_5)$ $(CT_3, CT_2, CT_4)$ $(CT_3, CT_2, CT_5)$ $(CT_1, CT_2, CT_3, CT_4)$ $(CT_1, CT_2, CT_3, CT_5)$ $(CT_1, CT_5)$ $(CT_1, CT_4)$ $(CT_3, CT_2)$.

Figure 11:
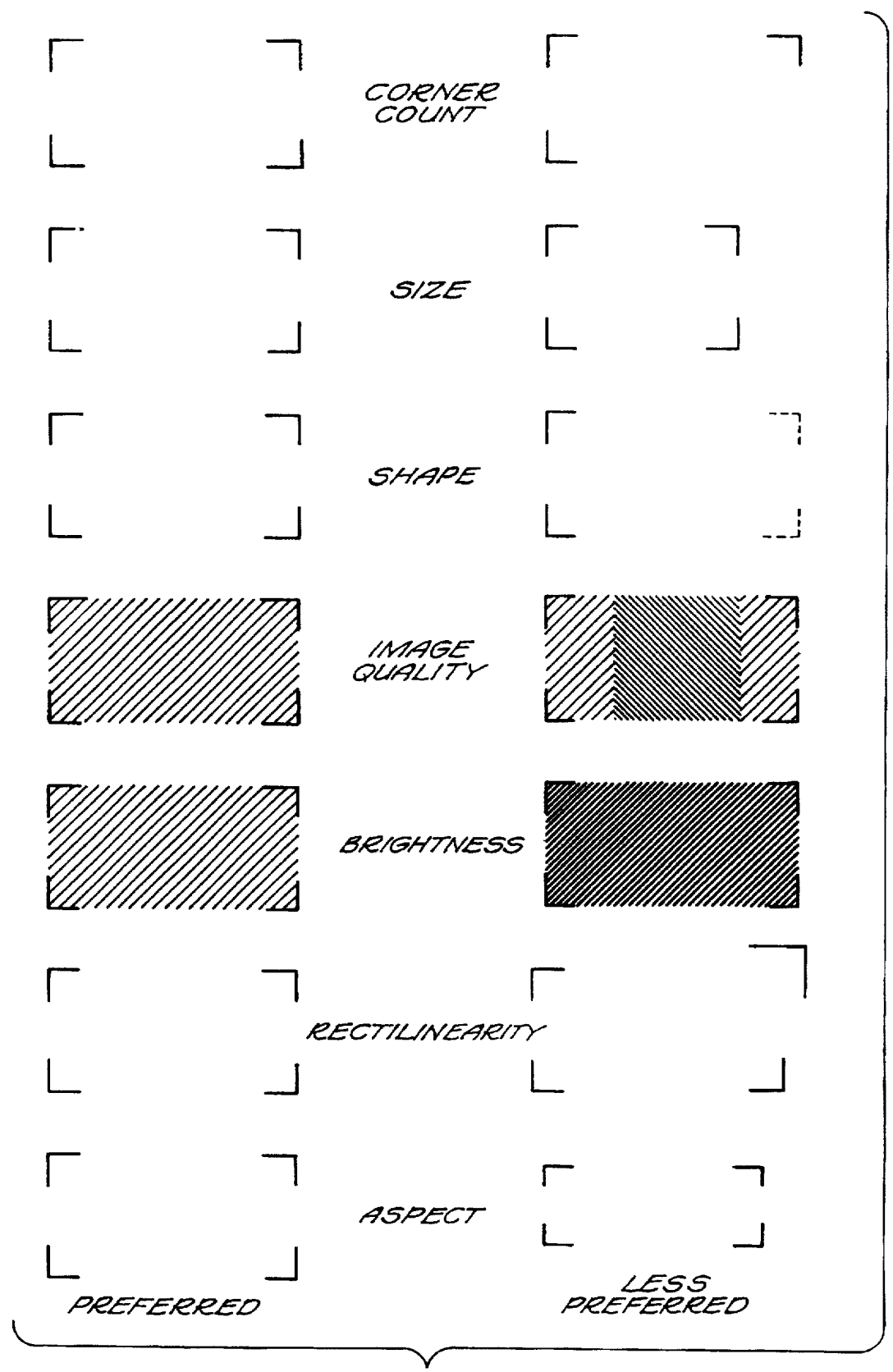
FIG. 11 illustrates characteristics of bonding pads scored in practicing the invention.

In step 107, the candidate bonding pads are graded to determine which candidate bonding pad best defines the true pad. FIG. 11 illustrates criteria utilized in a preferred embodiment to rank candidates. As illustrated, each candidate may be graded by the number of corners present in candidate, the size of the resulting bonding pad, the shape of the resulting bonding pad, the quality of the image bounded by the candidate, the brightness of the image bounded by the candidate, the rectilinearity of the resulting bonding pad, and the aspect ratio of the resulting bonding pad.

A raw score is assigned for each scoring metric or criteria, which is then mapped into a "real" score. A mapping function maps the raw score into the "real" score, and is necessary for the normalization of the raw score values against one another and to give flexibility in assigning scores. The final grade assigned to the candidate is the geometric mean of the "real" score of all scoring metrics is calculated.

The preferred embodiment utilizes six scoring metrics: the corner count, the aspect ration, the rectilinearity, the pad size, the corner shape and the brightness. The corner count score is:

count-score=map(number of corners in candidate)

The aspect ratio score is the ratio of the width dimension with respect to the height dimension. The aspect ratio score is:

aspect-ratio-score=map (width/height)

Figure 12:
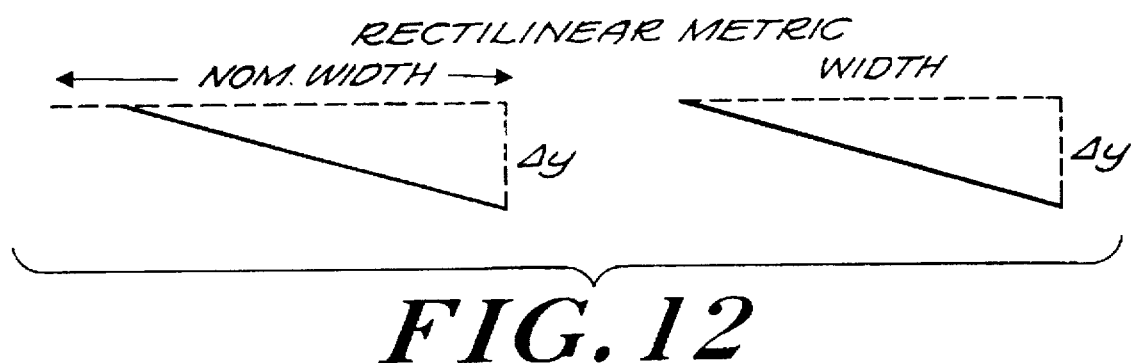
FIG. 12 illustrates the parameters that are used in calculating the rectilinearity score for a bond pad candidate.

The rectilinearity metric measures the deviation from a rectangle. As illustrated in FIG. 12, the slope is calculated, as a %, in the x and y direction, using the nominal pad width and height. These calculations are mapped and the average of the mapped for the four combinations of corners. The rectilinearity metric is calculated as:

rect-score=sum of map(100 * $\Delta y$/width) and map(100 * $\Delta x$/height)/4

Figure 13:
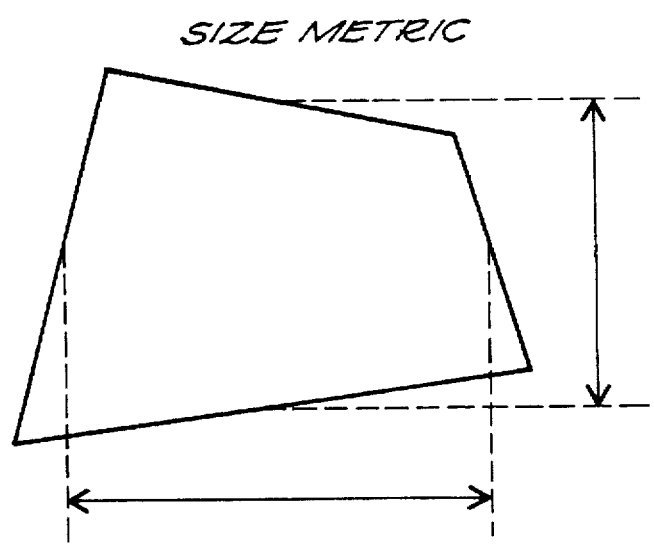
FIG. 13 illustrates calculating the size score for a bond pad candidate.

The pad size metric is calculated by finding the width using the average left and average right points (that is, the mid point of upper left and lower left corners and the mid point of upper right and lower right corners). FIG. 13 illustrates this operation. The ratio, calculated as a %, of the calculated width is compared with nominal width and is then mapped. The same operations are performed for the height. The size-score is the average of these two calculated ratios. Thus the size metric is:

$$\text{size-metric} = (\text{map}(100 * \text{average width/nominal width}) + \text{map}(100 * \text{average height/nominal height}))/2$$

The corner shape metric is:

$$\text{shape-score} = \text{sum}(\text{map}(\text{correlation score for a corner}))/(\text{number of found corner})$$

The corner brightness metric is:

$$\text{brightness\_score} = \text{map}(\text{average intensity of found corners})$$

Once the candidates are graded an overall score is assigned according to a weighing, such as:

$$\text{score} = (\text{score}_1 * \text{score}_2 * \ldots * \text{score}_n)^{1/n}$$

The mapping functions to map raw scores into "real" scores is important in deriving an overall score. In order to describe the principle of the mapping function, or look up table ("lut"), let us consider the lut for pad size metric.

Figure 14:
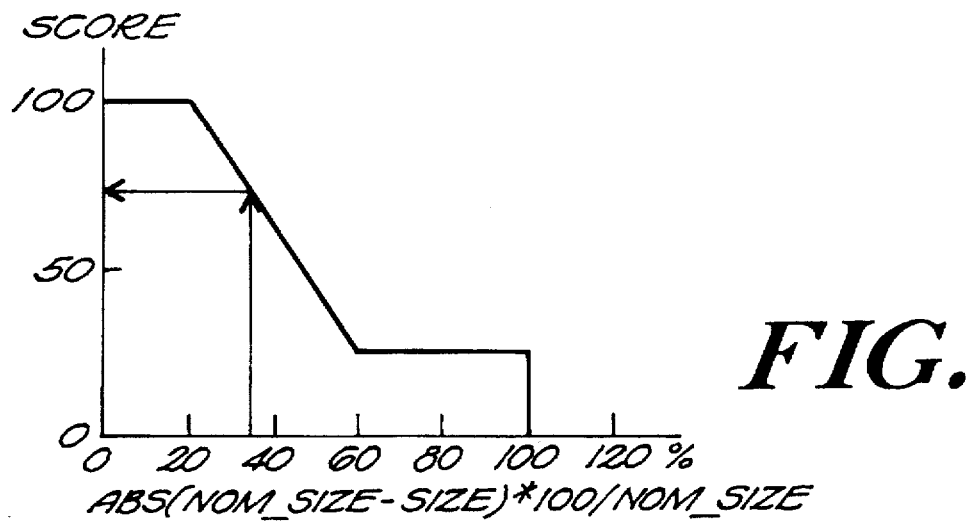
FIG. 14 illustrates a mapping function for the size score.

We like to give a good score of 100 for the size close to the nominal size within 20%. We give a score decreasing linearly beyond 20% deviation up to 60% deviation where the score is 25. For the deviation between 60% and 100%, we give a fixed score of 25. If the size is more than twice as big as the nominal size, then we give 0 score. These facts are expressed in lut illustrated in FIG. 14.

Figure 15:
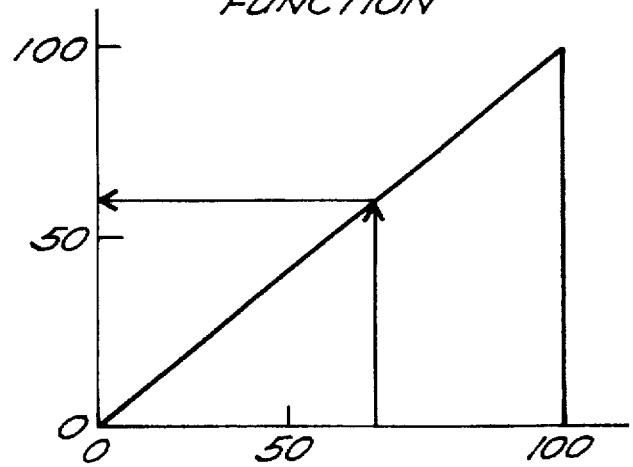
FIG. 15 illustrates a non-modifying one-to-one mapping function.

Another example of the lut is the extreme case of not modifying the raw score value. For example, the raw score returns the value between 0 and 100. In this case we take the starting point is 0, the end point is 100, and the cutoff point is 100. This leads to the lut in FIG. 15.

One can see that by changing the lut, one obtains a better method in scoring raw measured quantities, reflecting various factors in measurement such as tolerance or precision. Thus, the lut for each individual metric must be tuned to reflect the device characteristics and the vision capabilities.

Once a score is assigned, the highest ranking candidate is chosen in step 112 of FIG. 6 as representing the bonding pad. In step 114, the location of the pad is calculated using the locations from the chosen candidate's corner templates and the angle Θ. Those skilled in the art will appreciate that will include translating the location into the non-rotated coordinate system of the die frame. The translation may be accomplished in a conventional manner known in the art.

An automated wire bonding system according to the invention uses the methodology illustrated in FIG. 6, and described above, in two phases. In the first phase, the training phase, the steps of FIG. 6 are executed for each bonding pad on an integrated circuit die. As the location of each bonding pad is found, it is stored away for later retrieval. Once the training phase is completed, the system can operate in a run-time phase to quickly locate the bonding pads of additional die of the same type.

The run-time phase entails executing the steps of FIG. 6 to locate a first bond pad or other reference feature on each additional die. If other reference features are located, FIG. 6 must be modified as known in the art. Once the first bonding pad or other reference feature is located, the location of the others may be inferred from the store of locations generated during the training phase, i.e., based on its previously-determined location relative to the first pad. It will be readily appreciated that this facilitates pad location as it requires the system to search for only one pad.

It will be appreciated that the embodiments described herein are not intended to be limiting, and that other embodiments incorporating additions, deletions and other modifications with the ken of one of ordinary skill in the art are in the scope of the invention.

In view of the foregoing, what is claimed is:

1. A method of operating a digital data processor to locate bond pads in an input image of a die mounted in lead frame, the digital data processor being of a type having corner template generating means for generating a template of one or more bonding pad corners, image rotating means for generating, from an applied image, a rotated image that represents the applied image rotated a specified angle, search means for determining a location of an applied template in an applied image, and pad locating means for determining, from applied locations of one or more corners of a bonding pad and an applied angle of the die, a location of one or more of bond pads of the die, the method comprising:
   (a) applying the input image to the image rotating means to generate a image of the die unrotated relative to the lead frame, that image being referred to herein as a counter-rotated image;
   (b) invoking the corner template generating means to generate templates that represent plural corners of an unrotated bonding pad;
   (c) for each of at least one bonding pad in the image applying the templates and the counter-rotated image to the search means to determine locations of apparent corners of that bonding pad; and applying those locations, along with the angle of the die relative to the lead frame, to the pad locating means to determine a location of the bonding pad.

2. A method according to claim 1 further comprising a training step for executing steps (a)–(c) to determine locations of plural bond pads in an image of a model die mounted in a lead frames and for storing those locations, a run-time step for executing steps (a)–(c) to determine locations of a first bond pad in an image of an actual die mounted in a lead frame, and for determining locations of other bond pads in that image based on the location of the first bond pad and on the locations stored in the training step.

3. The method of claim 1 wherein step (c) further comprises the steps of:

creating a set of candidate bond pads based on at least pairs of locations of the apparent corners;

scoring each candidate bond pad;

selecting as the actual bond pad a candidate bond pad based upon its score; and determining a location of the actual bond pad.

4. The method of claim 3 wherein the step of scoring a candidate bond pad comprises determining a number of apparent corners present in that candidate bonding pad.

5. The method of claim 3 wherein the step of scoring a candidate bond pad comprises determining its shape based on a correlation of each apparent corner.

6. The method of claim 3 wherein the step of scoring a candidate bond pad comprises determining its size based on the locations of the apparent corners.

7. The method of claim 3 wherein the step of scoring a candidate bond pad comprises determining visual characteristics of at least one of its apparent corners.

8. The method of claim 7 wherein the step of scoring a candidate bond pad comprises determining a brightness of the input image at the location of at least one of its apparent corners.

9. The method of claim 3 wherein the step of scoring a candidate bond pad comprises determining its rectilinearity.

10. The method of claim 3 wherein the step of scoring a candidate bonding pad comprises determining its aspect ratio.

11. The method of claim 3 wherein the step of scoring a candidate bonding pad comprises determining at least two of a number of apparent corners present in that candidate bonding pad;

a shape of that candidate bonding pad based on a correlation of each of the apparent corners;

a size of that candidate bonding pad based on the locations of the apparent corners;

a brightness of the input image at the location of at least one of apparent corner of that candidate bonding pad;

a rectilinearity of that candidate bonding pad; and an aspect ratio of that candidate bonding pad.

12. The method of claim 1, comprising determining the angle of the die relative to the frame by finding a contour of the die in the image and for determining an angle of that contour.

13. The method of claim 1, comprising determining the angle of the die relative to the frame by the steps of generating one or one or more candidate die templates, each representing the die at a respective predetermined angle of rotation;

identifying one or more of those candidate die templates that best match the die in the input image;

determining the angle of rotation of the die in the input image relative from the predetermined angle rotation of the candidate die templates that best match the die in the input image.

* * * * *